UNITED STATES PATENT OFFICE.

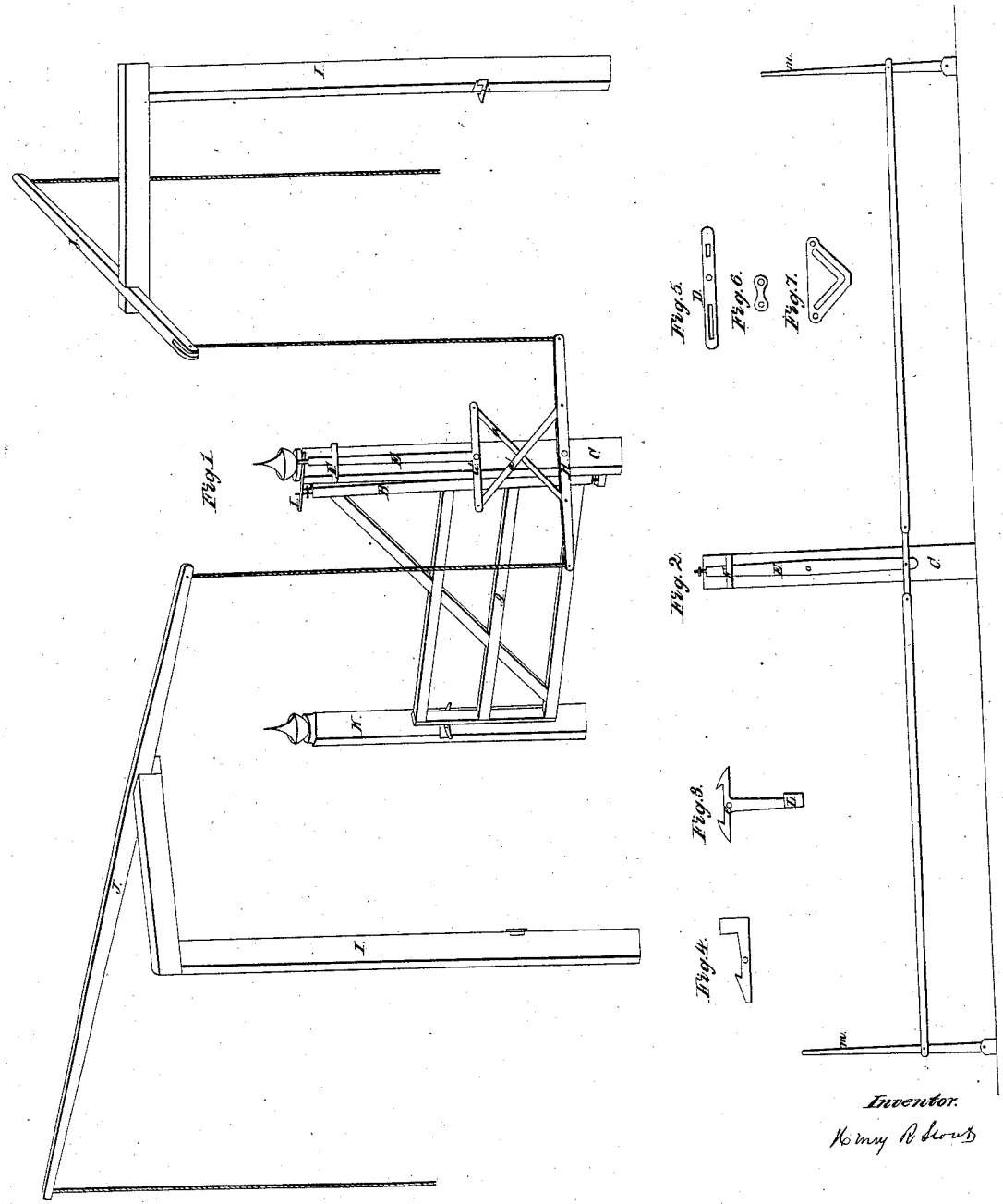

HENRY R. SLOAT, OF SLOATSBURG, NEW YORK.

FARM-GATE.

Specification of Letters Patent No. 32,793, dated July 9, 1861.

*To all whom it may concern:*

Be it known that I, HENRY R. SLOAT, of Sloatsburg, Rockland county, State of New York, have invented a new and Improved Gravitating Farm-Gate to be Opened and Closed from the Carriage; and I do hereby declare that the following is a full and exact description thereof, reference being had to the accompanying drawings and to the letters of reference marked thereon.

Figure 1 is a perspective view of the gate and the apparatus for opening and closing same. Fig. 2 shows a different plan for opening and closing the gate by means of levers to be moved from the carriage. Fig. 3 shows the main catch to hold the gate shut. Fig. 4 shows the catch for holding the gate open. Fig. 5 shows the lever composed of metal with slots and pivot hole for attaching the long arm of the gate to the main post by means of which the gate is opened and closed. Fig. 6 is a metal coupling holding the arm of the gate to the main post at the top. Fig. 7 is a metal Y for the purpose of showing that the gate may be opened and closed by applying the power to the bottom instead of at the top of the arm of the gate.

A., Fig. 1, is an ordinary farm gate without any hinges, with an iron pin or gudgeon in each end of the arm "B." the lower end of which rests in a socket attached to the post "C." or it may rest upon timber firmly embedded in the ground or an ordinary hinge may be used. The upper end of the arm of the gate is secured to the main post "C." by the iron coupling shown in Fig. 6, the iron pin or gudgeon extending through the long slot in the lever "D." as shown in Fig. 5. This lever is secured to the top of the main post "C." by an iron pin through the center on which it can turn freely. The rod "E." is then inserted through the short slot in the end of lever "D." and held in position by the band "F." and firmly bolted to the post at the cross bar "G." leaving room for the rod "E." to play on the bolt. The bar "H" is then bolted in the same manner to the post "C" and united to the rod "E" by the cross arms "a. a." which work in a joint at each end as shown in Fig. 1, so that when either end of the bar "H" is raised the gate is thrown open in the opposite direction. The posts "I. I," of suitable size, are then placed at the proper distance and levers "J. J." attached from the ends of which wires or rods are attached to the ends of the bar "H." These levers are so adjusted that the ends from which the cord is suspended are over the center of the road, the cord being within convenient reach of persons in carriages or on horseback. The cord when pulled sets the described levers and rods in motion so that lever "D" by means of the long slot, acting on the top of the arm of the gate throws the gate out of plumb and compels it to swing open by its own gravity, where it is held by a peculiarly constructed catch shown in Fig. 4. On passing through the gateway the opposite cord is pulled and the gate closes in such a manner that it cannot pass the center, and this is accomplished by a catch shown in Fig. 3. This catch plays freely upon the bolt "c" Fig. 3, by which it is secured to the gate post "K."

Instead of using an ordinary latch, two iron pins are inserted in the end of the short arm of the gate, in such a position that the upper pin will strike the slide of the catch Fig. 3, which instantly yields allowing the upper pin to pass over till the lower pin strikes the lower end of the catch "L," when the whole weight of the gate is driven up an inclined plane till the upper pin is stopped by the opposite hook of the catch. The gate is thus securely shut, and cannot be rubbed or pushed open by cattle. The side catches are intended to act on the same principle of yielding instantly and receiving the slam of the gate on an inclined plane.

Fig. 2 is intended to show a different plan for opening the same gate by means of the levers "M. M." placed at suitable distances. Fig. 7 is also intended to show another means of applying the same principle of throwing the gate out of plumb, while it rests on a Y by moving the bottom of the long arm of the gate in the grooves shown in Fig. 7 by means of the levers "M. M." in Fig. 2, attached to the bottom of the long arm of the gate.

I make no claim for the idea of opening gates from carriages by means of cords suspended from levers. I therefore do not claim for the levers "J. J." separately, but

What I claim as my invention, and desire to secure by Letters Patent is—

The combination of the devices herein described, as shown in Fig. 1, for the purpose of opening and closing a gate in the manner substantially as set forth.

HENRY R. SLOAT.

Witnesses:
   CHS. D. WOOD,
   J. J. SLOAT.